No. 828,646. PATENTED AUG. 14, 1906.
E. R. FREDERICK.
LAWN RAKE.
APPLICATION FILED MAY 9, 1906.

Witnesses
Inventor
Emil R. Frederick.
By
Attorney

UNITED STATES PATENT OFFICE.

EMIL R. FREDERICK, OF HOLLAND, MICHIGAN.

LAWN-RAKE.

No. 828,646.　　　　　Specification of Letters Patent.　　　Patented Aug. 14, 1906.

Application filed May 9, 1906. Serial No. 315,999.

*To all whom it may concern:*

Be it known that I, EMIL R. FREDERICK, a citizen of the United States, residing at Holland, in the county of Ottawa and State of Michigan, have invented certain new and useful Improvements in Lawn - Rakes, of which the following is a specification.

My invention relates to improvements in lawn-rakes; and its objects are, first, to provide a lawn-rake with which grass, leaves, and other refuse raked from a lawn may be readily picked up and carried to a convenient piling or storage place without the necessity of the operator stooping or having to hold the grass, &c., on the rake with his hand, and, second, to so arrange an auxiliary head and teeth in connection with the usual rake head and teeth that the auxiliary rake will stand normally away from the rake-head and in position to be readily utilized in combination with the rake to pick up leaves, &c. I attain these objects by the mechanism illustrated in the accompanying drawings, in which—

Figure 1:
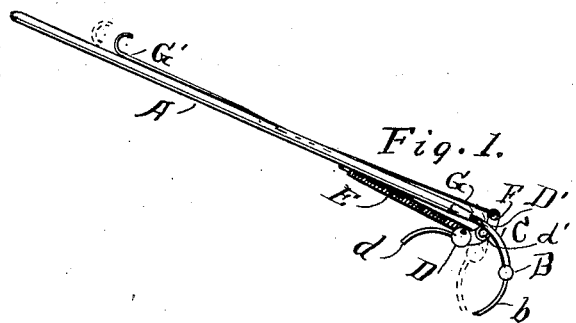
Figure 2:
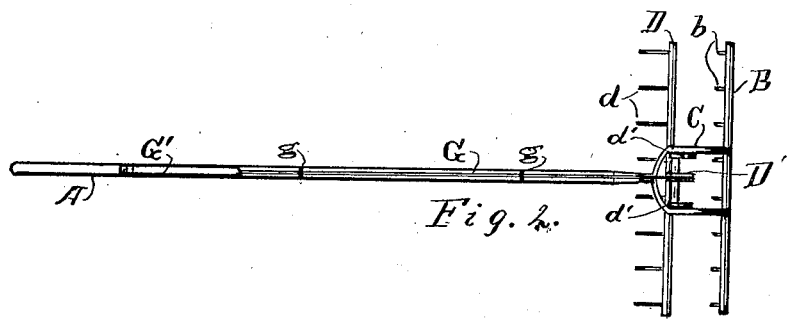
Figure 3:
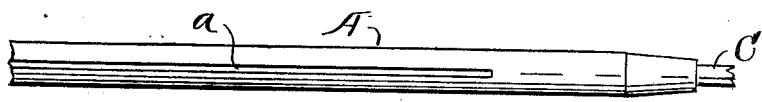

Figure 1 is a side view of a rake with my attachment in place in its normal position. Fig. 2 is a plan of the same; and Fig. 3 is a back or upper view of the handle, showing the groove in which the actuating-wire is embedded.

Similar letters refer to similar parts throughout the several views.

A represents a rake stale or handle. B represents a rake-head having teeth $b$, the head being connected with the handle by a neck C, to which the auxiliary head D is pivoted, as at $d'$, so that it may be made to move to and from the rake-head, as indicated by the solid lines D D' $d$ and by the corresponding dotted lines in Fig. 1. This head is held in normal position, as indicated in Fig. 1, by means of a spring E, secured at one end to the auxiliary head and at the other end to the handle, as shown, and to draw the teeth $d$ toward the teeth $b$, as indicated by the dotted lines in Fig. 1, a wire G is secured at one end to the upper end of the lever D', as at F, and at the other end to a slide G', arranged to be conveniently manipulated by the operator. This wire is preferably made to lie in a groove $a$ in the upper side of the handle A, so that there will be no danger of hurting the hand of the operator by pinching, cutting, or otherwise, the wire being prevented from drawing out of the groove by small staples $g$ or any other available means.

As will be readily seen, when the operator has raked up a quantity of grass or leaves he can while the rake is still in contact with them throw the auxiliary teeth $d$ toward the teeth $b$ and confine the rakings between them by drawing upon the slide G', and when the effort is removed from the slide the spring E will draw the auxiliary head back to its normal position.

Having thus fully described my invention, what I claim as new, and desire to secure by Letters Patent of the United States, is—

In combination with a rake-head, a rake-stale having a groove in the upper surface, and a curved neck connecting the rake head and stale, an auxiliary rake-head pivotally attached to the lower side of the neck, a spring connected at one end to the stale and at the other end to the auxiliary rake-head, an arm projecting up from the auxiliary head above the neck, an actuating-slide G' placed at one end of the slot, a cord passing therefrom through the slot and secured at the other end to the arm on the auxiliary head, and staples securing the actuating-slide and the cord to the handle and in the groove, substantially as and for the purpose set forth.

Signed at Grand Rapids, Michigan, May 3, 1906.

EMIL R. FREDERICK.

In presence of—
　DANIEL TEN CATE,
　MAUDE WILLIAMS.